June 19, 1956            A. N. GRAY            2,750,627
APPARATUS FOR WORKING AND ADVANCING A PLASTIC MATERIAL
Filed Oct. 6, 1954                                3 Sheets-Sheet 1
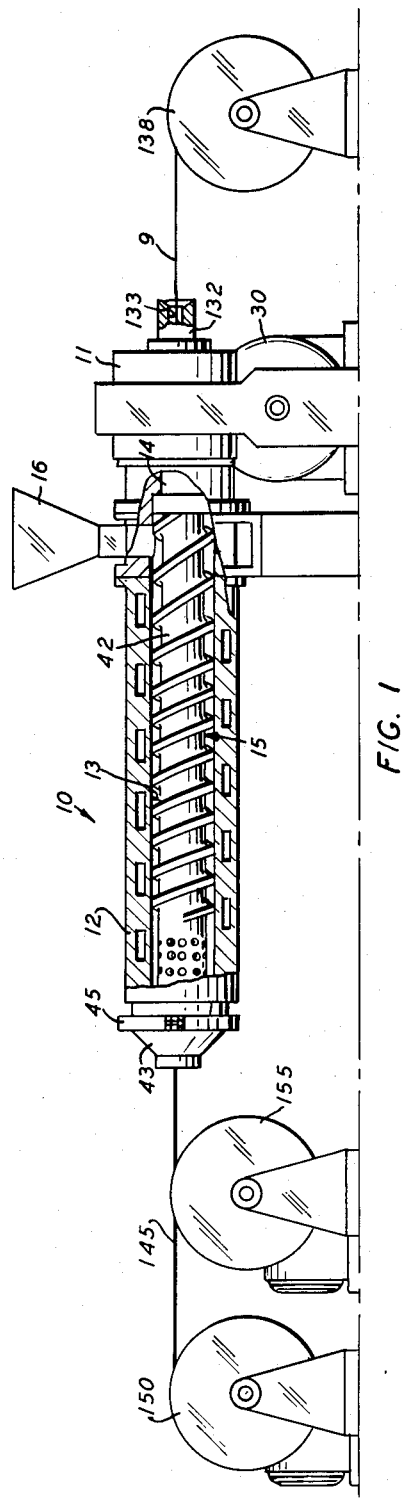
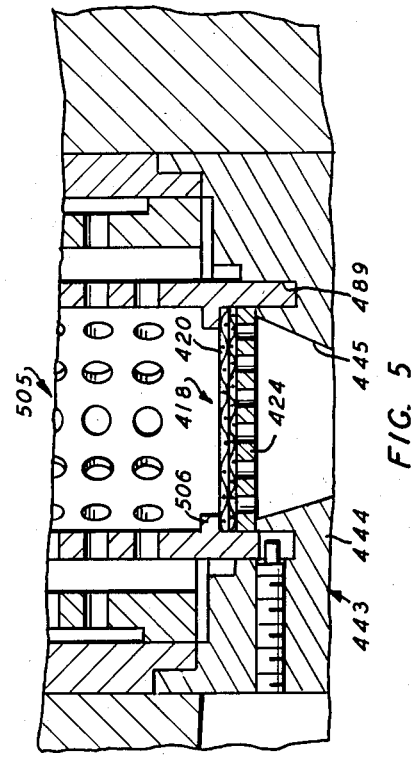
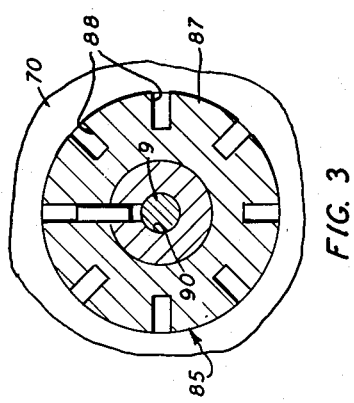
INVENTOR.
A. N. GRAY
BY
ATTORNEY INVENTOR.
A. N. GRAY
BY [signature]
ATTORNEY June 19, 1956 A. N. GRAY 2,750,627
APPARATUS FOR WORKING AND ADVANCING A PLASTIC MATERIAL
Filed Oct. 6, 1954 3 Sheets-Sheet 3

INVENTOR.
A. N. GRAY
BY
ATTORNEY

United States Patent Office 2,750,627
Patented June 19, 1956

2,750,627

APPARATUS FOR WORKING AND ADVANCING A PLASTIC MATERIAL

Alvin N. Gray, Edgewood, Md., assignor to Western Electric Company, Incorporated, New York, N. Y., a corporation of New York Application October 6, 1954, Serial No. 460,543

14 Claims. (Cl. 18—13)

This invention relates to an apparatus for working and advancing a plastic material, and more particularly to an appartaus for advancing, working, mixing, homogenizing, straining and extruding plastic materials.

In the manufacture of extruded products, such as insulated electrical conductors, plastic material, such as a thermoplastic compound or a vulcanizable compound is extruded upon a conductor while the material is in a plastic condition. In order to insure a product having satisfactory physical and electrical properties, it is desirable that the plastic material be thoroughly plasticated, mixed, homogenized and strained to effect a high degree of uniformity throughout. A high degree of uniformity of the plastic mix is especially important in applications involving cellular plastic insulating compounds, such as cellular polyethylene or the like.

In the manufacture of conductors insulated with a cellular polyethylene, a solid polymer of ethylene may be mixed with a heat-decomposable, chemical blowing agent. The extrusion temperature and pressure are so controlled that, as the extruded tubular covering of polyethylene issues from the die of the extruder, gas evolved by heat-decomposition of the blowing agent expands the covering into a cellular form containing a multiplicity of minute, discrete, gas-filled cells. To obtain the most satisfactory electrical properties in the finished product, it is desirable that these cells be minute, substantially equal in size and distributed uniformly throughout the tubular covering. One of the most difficult problems encountered in such an extrusion process is that of achieving a high degree of uniformity throughout the plastic mix before it envelops the conductor in the die to insure a uniform distribution of minute cells of substantially equal size throughout the expanded cellular plastic covering.

It is an object of this invention to provide a new apparatus for working and advancing a plastic material.

Another object of this invention is to provide a new apparatus for advancing, working, mixing, homogenizing, straining and extruding plastic materials.

Extrusion apparatus for working and extruding a plastic material, which illustrates certain features of the invention may include a conduit, an elongated stock screw mounted rotatably in the conduit for simultaneously working and forcing plastic material through the conduit, a hollow perforated shell connected for rotation with the screw, an extrusion head mounted at the delivery end of the conduit and provided with an opening formed therein in communication with the interior of the perforated shell, and means for rotating the screw to continuously force the plastic material axially along the conduit, radially through the perforations in the shell and then into the opening in the extrusion head.

A complete understanding of the invention may be obtained from the following detailed description of the invention, when read in conjunction with the appended drawings, in which:

Fig. 1 is a side elevation of an extrusion apparatus forming one embodiment of the invention with parts thereof broken away for clarity;

Fig. 3 is an enlarged, fragmentary, vertical section taken along line 3—3 of Fig. 2;

Fig. 5 is a fragmentary, transverse, horizontal section of an extrusion apparatus forming a second alternative embodiment of the invention.

Figure 2:
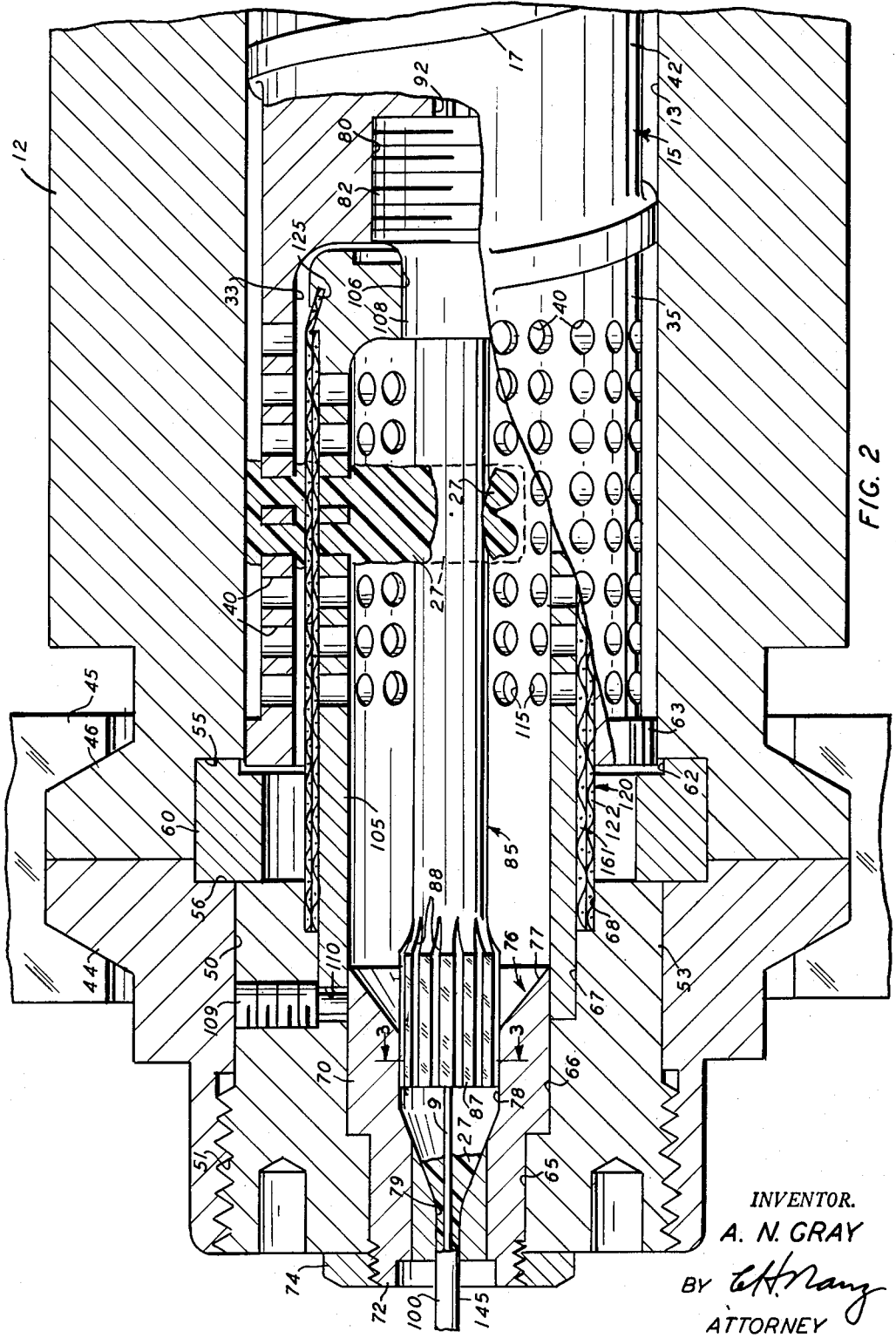
Fig. 2 is an enlarged, fragmentary, horizontal section taken along line 2—2 of Fig. 1, with parts thereof broken away for clarity.

Referring now to Fig. 1, there is shown an extrusion apparatus for applying continuously a tubular sheath of either a solid or a cellular plastic insulating material upon a continuously advancing, filamentary conductor 9. The extrusion apparatus includes a plastics extruder, indicated generally at 10, which comprises a housing 11 and an elongated, horizontally extending, extrusion barrel 12 attached thereto. The extrusion barrel 12 is formed with a cylindrical bore 13 (Fig. 2) extending longitudinally therethrough. Rotatably mounted within the bore 13 is an elongated stock screw 15 having at one end thereof a rearwardly extending shank 14 driven rotatably through a suitable gear train (not shown) positioned within the housing 11.

A suitable plastic material 27, for example a mixture of granular polyethylene and a heat decomposable blowing agent, such as dinitroso pentamethylene tetramine, or the like, is fed to the extrusion bore 13 from a feed hopper 16. The gear train is actuated by a motor 30, and when the motor is energized, the screw 15 is rotated continuously to knead and force the plastic material 27 under high pressure toward the delivery end of the extrusion bore 13.

As shown in Fig. 2, the delivery end of the screw 15 is provided with a deep, longitudinally extending counterbore 33, forming a hollow cylinder 35 at the outer end of the screw. The wall of the hollow cylinder 35 is relatively thin and is provided with a multiplicity of perforations 40—40 arranged in a plurality of rows and spaced around the entire circumference thereof. The perforations 40—40, as illustrated in Fig. 2, preferably are circular in cross section and of a diameter of approximately ⅛ inch, but may have other configurations and dimensions. The screw 15 is provided with a single helical flight 17 having a helix angle of approximately 10°, which extends forward from the shank 14 to a point on the periphery of the screw immediately adjacent to the closed end of the counterbore 33. The outer periphery of the cylinder 35 formed at the delivery end of the screw 15 is preferably unthreaded but may be threaded. As is evident from Fig. 1, a root portion 42 of the screw 15 is preferably tapered, and diminishes gradually and uniformly in cross section from a maximum diameter at the delivery end, which is substantially less than the inner diameter of the extrusion bore 13, to a minimum diameter adjacent to the feed hopper 16.

An extrusion head 43 having an annular tapered flange 44 thereon is removably secured by means of an adjustable, split ring clamp 45 to an annular, tapered flange 46 formed on the forward end of the barrel 12. The extrusion head 43 is provided with an axial, cylindrical opening 50 extending longitudinally therethrough, the forward end of which is provided with a threaded counterbore 51 designed to receive an externally threaded die holder 53.

The opposed faces of the extrusion barrel 12 and the extrusion head 43 are provided with complementary, annular counterbores 55 and 56, respectively, to receive a retaining ring 60 serving as a seal to prevent leakage of the plastic material 27. The rear face of the retaining ring 60 is relieved by an annular recess 62 which is designed to receive closely a portion of an annular flange 63 formed on the periphery of the forward edge of the perforated cylinder 35. The flange 63 has an outer diameter substantially equal to the inner diameter of the extrusion passage in the barrel, whereby it functions primarily as a seal to prevent plastic material being forced along the bore 13 from advancing therefrom except through the perforations 40—40 formed in the cylinder 35.

When the extrusion head 43 is secured upon the delivery end of the extrusion barrel 12, the opening 50 and counterbore 51 formed in the extrusion head are aligned concentrically with respect to the common longitudinal axis of the screw 15 and the extrusion bore 13. The die holder 53, which is mounted within the opening 50 and threaded counterbore 51, is provided with a central bore 65 and a plurality of communicating counterbores 66, 67 and 68 aligned concentrically with respect to the longitudinal axis of the extrusion bore 13. An extrusion die 70 having an exterior surface complementary to the central bore 65 and counterbore 66 fits closely within the die holder 53. A threaded extension 72 formed on the die 70 protrudes beyond the forward face of the die holder 53 and is engaged by an externally threaded lock nut 74. The lock nut 74, when drawn up tightly on the threaded extension 72, holds the die 70 fixedly within the die holder 53.

The extrusion die 70 is provided with a centrally located orifice 76 having an entrance portion 77 which tapers frustoconically forward from a diameter equal to the diameter of the counterbore 66 to a substantially cylindrical intermediate portion 78 of a somewhat lesser diameter. From the cylindrical intermediate portion 78, the die orifice 76 tapers frustoconically down to a restricted throat portion 79 having a relatively smaller diameter.

Formed concentrically in the closed end of the counterbore 33 in the forward end of the screw 15, is a threaded counterbore 80 designed to threadedly receive an externally threaded adapter 82 provided on the inner end of an elongated core tube 85. The core tube 85 has an elongated intermediate shank portion 86 and an enlarged outer cylindrical plug 87, which is received partially within the cylindrical intermediate portion 78 of the die orifice 76. The plug 87 is provided with a plurality of longitudinally extending grooves 88—88 spaced around the periphery thereof, as shown in Fig. 3. The outer diameter of the plug 87 is substantially equal to the diameter of the corresponding portion of the die orifice 76. As a result, the flow of plastic material 27 is limited to that which can pass through the grooves 88—88, and the advancing plastic material 27 is broken up into a plurality of thin streams of equal sizes uniformly distributed circumferentially around the plug 87.

Extending longitudinally through the center of the core tube 85 is an axial bore 90 (Fig. 3), which communicates at one end with a central, longitudinally extending bore 92 formed in the screw 15. The bore 92 permits the passage of the filamentary conductor 9, which is advanced axially through the center of the screw 15 and the core tube 85, and through the throat portion 79 of the die orifice 76.

Fitting concentrically within the perforated cylinder 35 formed on the forward end of the screw 15, is a hollow, cup-like cylinder 105. The inner end of the cylinder 105 is closed except for a central bore 106 which fits closely around an enlarged shoulder portion 108 formed on the inner end of the shank portion 86 of the core tube 85 immediately adjacent to the threaded adapter 82. Running clearance is provided between the wall of the bore 106 and the periphery of the shoulder portion 108 of the core tube to permit rotation of the core tube with the extruding screw 15 relative to the hollow cylinder 105, which remains stationary with the extrusion die 70 and the die holder 53. The other end of the hollow cylinder 105 is open, and is secured within the counterbore 67 in the die holder 53 against the outer periphery of the inner end of the extrusion die 70. A set screw 109, threadedly received within the wall of the die holder 53, engages a slot 110 formed in the adjacent end of the cylinder 105, and prevents rotation thereof relative to the die holder.

The wall of the hollow cylinder 105 adjacent to the perforated cylinder 35 formed on the forward end of the extruding screw 15 is similarly provided with a multiplicity of perforations 115—115 arranged in a plurality of rows and spaced around the entire circumference thereof. These perforations 115—115, like the perforations 40—40, are preferably circular in cross section and of a diameter of the order of ⅛ inch. The external diameter of the hollow cylinder 105 is somewhat less than the inner diameter of the cylinder 35, whereby an annular space is provided between the two cylinders.

Fitting closely around the perforated cylinder 105 is a screen-pack 120, consisting of two closely fitting sleeve-like screens 121 and 122, made preferably of 30-mesh and 60-mesh stainless steel wire screening, respectively, which are secured fixedly near one end thereof within the counterbore 68 in the die holder 53. The opposite end of the outer screen 121 is received within an annular, angularly-disposed notch 125 formed in the outer periphery of the cylinder 105.

Referring again to Fig. 1, a hollow shaft 132 extends rearwardly a short distance beyond the housing 11, and is provided with an axial passageway 133, which communicates with the axial bore 92 formed in the screw 15.

The conductor 9 is advanced from a supply reel 138 through the passageway 133 in the hollow shaft 132, through the axial bore 92 in the screw 15, and through the bore 90 in the core tube 85. Upon leaving the forward end of the bore 90, the conductor 9 is enveloped by the plastic insulating material 27, and emerges from the extruder through the throat of the die orifice 76 covered with a continuous, tubular, concentric, insulating sheath 140. The resulting insulated conductor 145 is subsequently wound upon a takeup reel 150. A conventional capstan 155 is positioned between the extruder 10 and the takeup reel 150 to advance the conductor 9 continuously through the extruder from the supply reel 138.

*Operation*

In the operation of the apparatus described hereinabove, the filamentary conductor 9 is advanced continuously from the supply reel 138 through the extruder 10 via the communicating axial bores 90 and 92 in the core tube 85 and the screw 15, respectively, and emerges through the throat portion 79 of the die orifice 76. The plastic material 27 is simultaneously kneaded and forced forward through the extrusion bore 13 by the continuously rotating screw 15 and enters the confined annular space between the outer periphery of the perforated cylinder 35 and the wall of the extrusion bore. As the plastic material 27 is advanced along the extrusion bore it is worked with a uniformly increasing intensity, the pressure increasing uniformly as a result of the increasing diameter of the tapered root portion 42 of the stock screw 15.

The plastic material is forced radially under high pressure through the perforations 40—40 in the cylinder 35, through the screens 121 and 122 of the cylindrical screen-pack 120 and then radially through the perforations 115—115 in the stationary cylinder 105, whereupon it enters the annular chamber which is formed by the perforated inner wall of the stationary cylinder 105 and the outer periphery of the elongated shank portion 86 of the core tube 85. The plastic material then flows forward into the tapered entrance of the extrusion orifice 76 in the die 70 and breaks up into a plurality of thin streams substantially equal in size, which advance through the longitudinal grooves 88—88 formed in the periphery of the plug 87. These thin streams of plastic material 27, after passing through the grooves 88—88, converge upon and completely envelop the filamentary conductor 9 as it emerges from the forward end of the core tube 85 through the axial bore 90. The plastic material 27 is then shaped by the converging walls of the die orifice 76 into a tubular, concentric sheath 140 surrounding the conductor 9.

During the extruding operation, careful control is exercised over the temperature of the material within the confines of the extruder 10. If a heat decomposable, chemical blowing agent is employed, the temperature is so controlled that substantially all of the blowing agent decomposes during the passage of the plastic material 27 along the extrusion bore 13 prior to passing radially through the perforations 40—40 in the cylinder 35. To insure the extrusion of a very high quality sheath 140 on the finished insulated conductor 145, it is essential that the gas evolved by heat decomposition of the blowing agent is thoroughly ingested and uniformly mixed with the plastic material before entering the tapered entrance of the die orifice 76 in the die 70. The substantially complete ingestion of the evolved gas and the uniform mixture thereof with the plastic material is accomplished by severely working, mixing and homogenizing the plastic material and allowing sufficient time for the ingestion to take place.

By reason of the improved design of the hereinabove described extruder 10, the mass 27 of plastic material is thoroughly worked, mixed and homogenized before entering the tapered entrance of the die orifice 76. This end is achieved as a result of the work performed upon the plastic material by the rotating, tapered screw 15 and the severe and vigorous mixing and masticating action which occurs as the plastic material is forced radially through the perforations 40—40 and 115—115 in the relatively moving cylinders 35 and 105, respectively, and through the screen-pack 120. The perforated cylinder 35 grinds and masticates the flowing mass of plastic material, which moves continuously in a plurality of small streams through the perforations 40—40, against the perforated stationary cylinder 105, whereby the plastic material is thoroughly mixed and homogenized. The severity of this mixing and homogenizing action is dependent upon the amount of clearance provided between the perforated cylinders 35 and 105, the intensity increasing as the clearance is decreased. In the design illustrated in Fig. 2, the clearance is of the order of ⅛ inch.

The screens 121 and 122 of the screen-pack 120, through which the plastic material is forced, function to strain out any oversized particles therefrom. The novel design of the apparatus permits the use of a cylindrical screen-pack having its longitudinal axis aligned with the axis of the screw 15 as contrasted with conventional apparatus wherein the screen-packs are mounted transversely across the end of the screw. Since the diameter of the cylindrical screen-pack 120 is at least equal that of a conventional transversely positioned screen-pack and its length is considerably greater than its diameter, it follows that its effective screening area is much greater than that of the conventional type. Thus, the screen-pack 120 need not be removed for cleaning to remove clogged oversized particles as often as in the conventional apparatus.

The relatively large volume of the annular chamber formed by the perforated inner wall of the stationary cylinder 105 and the outer periphery of the elongated shank portion 86 of the core tube 85 increases the transit time of the plastic material and allows sufficient time for the substantially complete ingestion of the gas.

The flow of the plastic material through the die orifice 76 of the extrusion die 70 is limited to that which can pass through the longitudinal grooves 88—88. As a result, a considerable back pressure is built up within the confines of the extrusion head 43 and the extrusion bore 13. The back pressure built up in this manner contributes greatly to the successful extrusion of cellular plastic materials by maintaining the gas in its ingested state in the plastic material, while the plastic material is enveloping the conductor and is being formed into a unitary tubular sheath by the die orifice 76. Thus, when the sheath of plastic material issues from the extrusion die 70, the gas expands the sheath immediately into a cellular form containing a multiplicity of discrete, gas-filled cells, which as a result of the previous vigorous mixing and homogenizing action of the relatively rotating perforated cylinders 35 and 105 and the uniform mixture of the gas and the plastic material, are minute, substantially equal in size and distributed uniformly throughout a cross section of the sheath.

*First alternative embodiment*

Figure 4:
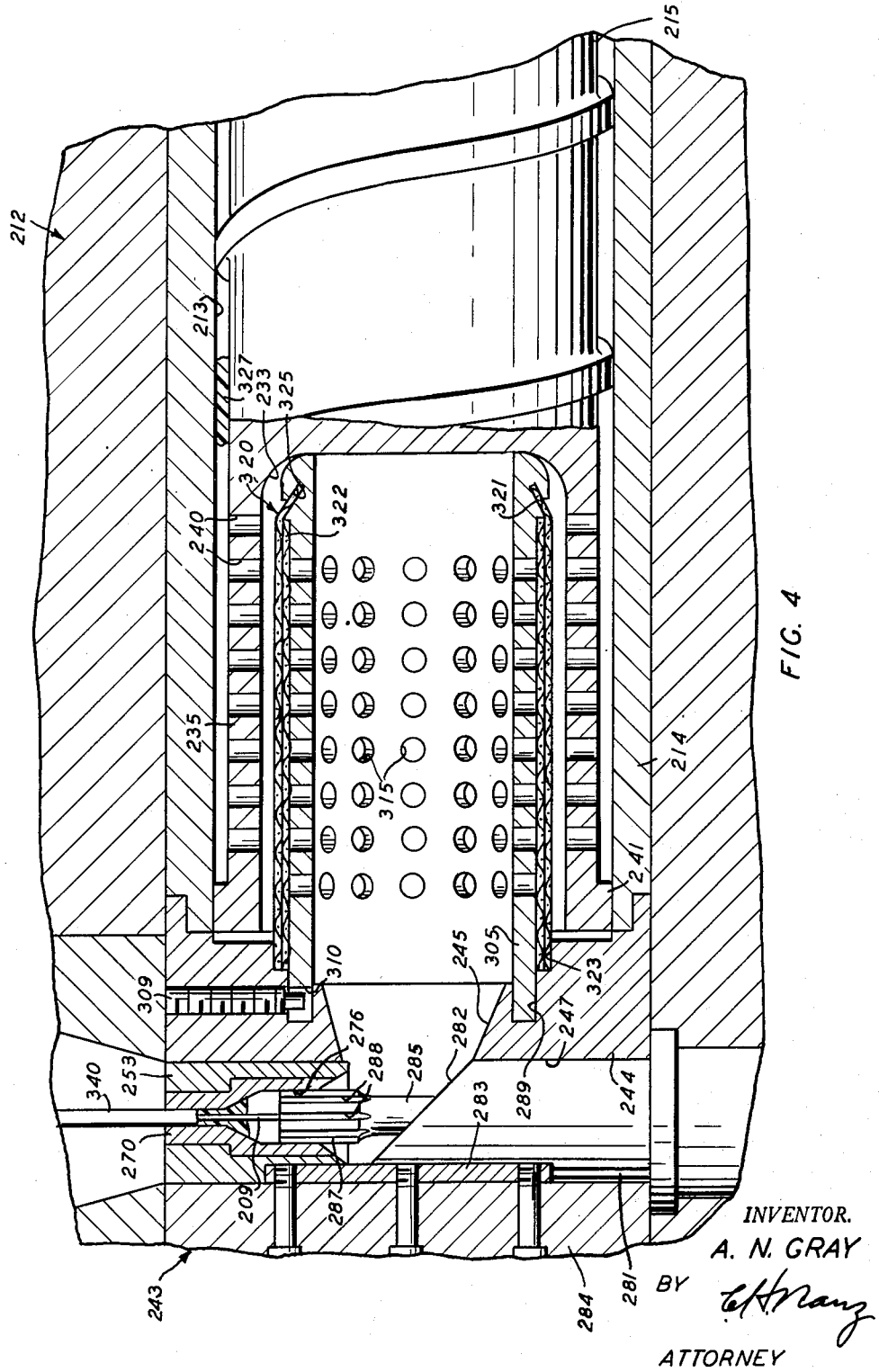
Fig. 4 is a fragmentary, transverse, horizontal section of an extrusion apparatus forming an alternative embodiment of the invention.

Referring now to Fig. 4, there is shown extrusion apparatus of the cross head type forming an alternative embodiment of the invention designed to apply an insulating covering on a filamentary conductor 209. This apparatus includes a hollow extrusion cylinder 212 and a cylindrical bore 213 is formed in a cylindrical liner 214 positioned in the cylinder 212. An elongated stock screw 215 is rotatably mounted in the bore 213. The stock screw 215 is rotated by suitable driving means of known design (not shown), such as an electric motor and a gear train like those described for the first embodiment of the invention.

The stock screw 215 is substantially identical in design to the screw 15 previously described, and is similarly provided at the delivery end thereof with a deep counterbore 233 which forms a hollow cylinder 235. The cylinder 235, like the cylinder 35, is provided with a multiplicity of perforations 240—240. A narrow, annular flange 241 is formed at the extremity of the delivery end of the screw 215 and is substantially equal in diameter to the inner diameter of the extrusion bore 213.

An extrusion head 243 affixed to the extrusion cylinder 212 includes a body member 244 having a tapered opening 245, which forms a continuation of the extrusion bore 213 and communicates with a bore 247 formed in the extrusion head transversely of the tapered opening 245. An annular die holder 253 is positioned in the exit end of the transversely extending bore 247 and has a counterbore 265 formed therein in which an extrusion die 270 is mounted. The extrusion die 270 is provided with a centrally located orifice 276.

The filamentary conductor 209 is advanced toward the left, as viewed in Fig. 4, by suitable core-advancing means (not shown), such as a capstan like the capstan 155, through a core tube holder 281 and a core tube 285 held by the core tube holder in the bore 247. The core tube holder 281 is provided with an inclined concave surface 282 designed to deflect the flowing plastic material toward the extrusion die 270. An aligning plate 283 maintains the die holder 253 and the core tube holder 281 centered relative to each other in the bore 247 in the extrusion head 243, and a retaining nut 284 holds these elements in place in the extrusion head.

The left hand end portion of the core tube 285, as viewed in Fig. 4, is formed with an enlarged, cylindrical plug 287 having a plurality of longitudinal grooves 288—288 of equal size spaced equally circumferentially thereabout. The plug 287 is partially received within a closely fitting, complementary intermediate portion of an extrusion orifice 276 formed in the die 270.

The inner face of the extrusion head 243 adjacent to the delivery end of the screw 215 is provided with an annular recess 289 which is arranged concentrically with respect to the mouth of the tapered opening 245. The annular recess 289 is designed to receive closely one end of a hollow cylinder 305 which protrudes from the extrusion head 243 rearwardly into the counterbore 233 formed in the delivery end of the screw 215. The hollow cylinder 305 is arranged concentrically with respect to the cylinder 235 formed on the delivery end of the screw 215 and has an outer diameter somewhat less than the inner inner diameter of the cylinder 235.

A dog-point set screw 309, threadedly received within the wall of the extrusion head 243 engages a slot 310 formed in the adjacent end of the hollow cylinder 305 and prevents rotation of the cylinder relative to the extrusion head. The opposite end of the hollow cylinder 305 extends to the closed end of the counterbore 233, where a running clearance is provided between the two relatively moving parts.

The hollow cylinder 305, which is similar to the hollow cylinder 105 of the first-mentioned embodiment hereinabove described, is likewise provided with a multiplicity of perforations 315—315 formed radially in the wall thereof adjacent to the perforated cylinder 235 formed on the delivery end of the screw 215. Fitting closely around the perforated cylinder 305 is a screen-pack 320 consisting of two closely fitting sleeve-like screens 321 and 322 made preferably of 30-mesh and 60-mesh stainless steel wire screening, respectively, which are secured fixedly at one end thereof within a counterbore 323 formed in the extrusion head 243. The opposite end of the outer screen 321 is received within an annular, angular-disposed notch 325 formed in the periphery of the cylinder 305.

Operation of first alternative embodiment

In the operation of the extruder described hereinabove, the stock screw 215 is rotated continuously to simultaneously knead and force the plastic material 227 through the extrusion bore 213. The advancing plastic material 227 enters the confined annular space between the outer periphery of the perforated cylinder 235 and the wall of the extrusion bore 213. The plastic material is then forced radially under high pressure through the perforations 240—240 in the cylinder 235, through the screens 321 and 322 of the cylindrical screen-pack 320, and then through the perforations 315—315 in the stationary cylinder 305, whereupon it enters the chamber formed by the perforated inner wall of the stationary cylinder 305 and flows into the tapered opening 245 in the extrusion head 243.

The plastic material then flows through the tapered opening 245 into the bore 247 wherein it surrounds the core tube 285 and enters the die 270, flowing through the grooves 288—288 in the plug 287. The plastic material after passing through the grooves 288—288 converges upon and completely envelops the filamentary conductor 209 which is advanced continuously through the core tube 285. The plastic material is then shaped by the converging walls of the die orifice 276 into a tubular, concentric sheath 340 surrounding the conductor 209.

The relatively rotating, perforated cylinders 235 and 305, and the screen-pack 320 function in a manner substantially identical to their counterparts described in connection with the embodiment of the invention shown in Figs. 1, 2 and 3 of the drawings. As a result of the work performed on the plastic material by the rotating, tapered screw 215, the relatively rotating perforated cylinders 235 and 305, and the screen-pack 320, the plastic material is thoroughly worked, mixed and homogenized before entering the tapered opening 245 in the extrusion head 243.

Second alternative embodiment

Referring now to Fig. 5, there is shown extrusion apparatus of the cross head type forming a second alternative embodiment of the invention designed to apply an insulating covering on a filamentary conductor. This apparatus is very similar to the apparatus described hereinabove in connection with the first alternative embodiment of the invention. However, in the second alternative embodiment a conventional plate-like strainer has been substituted for the cylindrical strainer heretofore described.

Referring now to Fig. 5, the apparatus includes a conventional cross head type extrusion head 443 having a body member 444 provided with a tapered opening 445. A stationary perforated cylinder 505, identical in construction to the cylinder 305 of the first alternative embodiment, except for the provision of an annular, integrally formed, internal flange 506, is mounted in a recess 489 provided in the body member 444. The flange 506 serves to hold a plate-like strainer 418 fixedly in place across the mouth of the tapered opening 445. The strainer 418 is composed of a circular plate-like screen-pack 420 supported by a rigid, perforated backing plate 424.

Operation of second alternative embodiment

The operation of the extruder, illustrated in Fig. 5, is similar to that described in connection with the first alternative embodiment of the invention, shown in Fig. 4. However, due to the change in the location of the strainer, in the second alternative embodiment, shown in Fig. 5, the straining of the plastic material takes place after the plastic material enters the interior of the cylinder 505, but before it passes through tapered opening 445 in the extrusion head 443.

The terms "plastic material" and "plastic compound" as employed in the specification and appended claims will be understood to include thermoplastic insulating compounds, such as polyvinyl compounds, plasticized polystyrene, nylon, polyethylene, or the like, in solid or cellular forms, and thermosetting compounds, such as rubber, Buna S and Neoprene compounds and compounds of other rubbery elastomers, or the like, in solid or cellular forms.

It will be understood further that various modifications of the invention may be made without departing from the spirit and scope thereof.

What is claimed is:

1. Extrusion apparatus for working and extruding a plastic material, which comprises a conduit, an elongated stock screw mounted rotatably in the conduit for simultaneously working and forcing plastic material through the conduit, a hollow perforated shell connected for rotation with the screw, an extrusion head mounted at the delivery end of the conduit and provided with an opening formed therein in communication with the interior of the perforated shell, and means for rotating the screw continuously to force the plastic material axially along the conduit and radially through the perforations in the shell into the opening in the extrusion head.

2. Extrusion apparatus for working and extruding a plastic material, which comprises a conduit, an elongated stock screw mounted rotatably in the conduit for simultaneously working and forcing plastic material through the conduit, a hollow perforated shell connected for rotation with the screw, an extrusion head mounted at the delivery end of the conduit and provided with an opening formed therein in communication with the interior of the perforated shell, and means for rotating the screw continuously, said screw being the sole means for forcing the plastic material along the conduit, radially through the perforations and through the opening in the extrusion head.

3. Continuous extrusion apparatus for working and extruding a plastic material, which comprises a conduit, an elongated stock screw mounted rotatably in the conduit for simultaneously working and forcing plastic material through the conduit, said screw having a recess formed within the delivery end thereof and a plurality of holes leading radially from the exterior of the screw to the recess, an extrusion head having a central opening communicating with said recess, and means for rotating the screw continuously to simultaneously work and force the plastic material axially along the conduit, radially through the holes into the recess and into the opening in the extrusion head.

4. Continuous extrusion apparatus for working and extruding a plastic material, which comprises a cylindrical conduit, an elongated stock screw mounted rotatably in the conduit and provided with a tapered root portion which increases uniformly in cross section along the length thereof to a maximum diameter at the delivery end thereof, said stock screw having a recess formed in the delivery end thereof and a plurality of holes leading radially from the exterior of the screw to the recess, an extrusion head having a central opening communicating with said recess, and means for rotating the screw continuously to simultaneously work and force the plastic material axially along the conduit under a uniformly increasing pressure and thence radially through the holes into the recess and through the opening in the extrusion head.

5. Continuous extrusion apparatus for working and extruding a plastic material, which comprises a conduit, an elongated stock screw mounted rotatably in the conduit for simultaneously working and advancing plastic material through the conduit toward the discharge end thereof, said screw having a longitudinally extending, cylindrical counterbore formed within the delivery end thereof, the wall of said counterbore being provided with a multiplicity of perforations leading radially from the exterior of the screw to the counterbore, an extrusion head having a central opening communicating with said counterbore, means for rotating the screw continuously to simultaneously work and force the plastic material along the conduit, and means for directing the material advancing along the conduit radially through the perforations into the counterbore and through the opening in the extrusion head under a high pressure.

6. Extrusion apparatus for working and extruding a plastic material, which comprises a conduit, an elongated stock screw mounted rotatably in the conduit for simultaneously working and forcing plastic material therethrough, two perforated tubular members mounted one within the other adjacent to the delivery end of the conduit, one of said perforated tubular members being connected for rotation with the screw relative to the other, an extrusion head mounted at the delivery end of the conduit and provided with an opening therein communicating with the interior of the inner tubular member, and means for rotating the screw continuously to simultaneously work and force plastic material axially along the conduit and then radially through the perforations in the relatively rotating tubular members into the opening in the extrusion head.

7. Extrusion apparatus for working and extruding a plastic material, which comprises a cylindrical conduit, an elongated stock screw mounted rotatably in the conduit and provided with a tapered root portion which increases uniformly in cross section along the length thereof to a maximum diameter at the delivery end, two perforated tubular members mounted one within the other at the delivery end of the conduit, one of said perforated tubular members being connected for rotation with the stock screw relative to the other, an extrusion head mounted at the delivery end of the conduit and provided with an opening therein communicating with the interior of the inner tubular member, and means for rotating the screw continuously to simultaneously work and force the plastic material axially along the conduit under uniformly increasing pressure and then radially through the perforations in the relatively rotating tubular members into and through the opening in the extrusion head.

8. Extrusion apparatus for working and extruding a plastic material, which comprises an extrusion cylinder having a longitudinally extending bore, an elongated stock screw rotatably mounted within the bore for simultaneously working and advancing a plastic material therealong, an extrusion head mounted at the delivery end of the extrusion cylinder and provided with an axial opening, a rotatable tubular member connected for rotation with the screw and provided with a multiplicity of perforations extending radially through its wall, a stationary tubular member projecting axially from the extrusion head into the rotatable tubular member and provided similarly with a multiplicity of perforations extending radially through its wall adjacent to the perforations on the rotatable tubular member, the interior of said stationary tubular member communicating with the axial opening in the extrusion head, and means for rotating the stock screw to force the plastic material axially along the bore in the extrusion cylinder and radially through the perforations in the relatively rotating tubular members, whereupon it flows continuously from the interior of the stationary tubular member through the opening in the extrusion head.

9. Extrusion apparatus for working and extruding a plastic material, which comprises an extrusion cylinder having a longitudinally extending bore, an extrusion head secured to the delivery end of the extrusion cylinder and provided with an axial opening formed therein, an elongated stock screw rotatably mounted within the bore and provided with a hollow chamber formed in the delivery end thereof, the wall of the chamber having a multiplicity of perforations extending radially therethrough, a hollow cup-shaped member extending from the extrusion head coaxially into the perforated chamber in the screw, the wall of said cup-shaped member being provided with a multiplicity of perforations extending radially therethrough, and means for rotating the screw to force a plastic material axially along the bore and then radially through the perforations into the opening in the extrusion head.

10. Extrusion apparatus for working and extruding a plastic material, which comprises an extrusion cylinder having a longitudinally extending bore, an elongated stock screw rotatably mounted within the bore for simultaneously working and advancing a plastic material along the bore, said screw having an axial counterbore provided in the delivery end thereof forming a hollow chamber, the walls of which are provided with a multiplicity of perforations extending radially therethrough, an extrusion head mounted at the delivery end of the extrusion cylinder and provided with an axial opening therein, a stationary, cylindrical, cup-like shell mounted concentrically within the chamber in the end of the screw with its open end communicating with the opening in the extrusion head, the wall of said shell being provided with a multiplicity of perforations extending radially therethrough, and means for rotating the screw to force a plastic material axially along the bore and then radially in seriatum through the perforations in the mixing chamber and the stationary shell into the opening in the extrusion head.

11. Extrusion apparatus for working and extruding a plastic material, which comprises an extrusion cylinder having a longitudinally extending bore, an elongated stock screw rotatably mounted within the bore for simultaneously working and advancing a plastic material therealong, the delivery end of said screw being provided with a relatively deep, longitudinally extending, cylindrical recess and a plurality of holes leading radially from the exterior of the screw to the recess, an extrusion head mounted at the delivery end of the extrusion cylinder and provided with a central axial opening therein, an elongated core tube mounted on and projecting from the delivery end of the screw coaxially through the recess into the opening in the extrusion head, a hollow cylindrical shell projecting from the extrusion head coaxially into the recess and surrounding the core tube and the opening in the extrusion head, said shell having a plurality of holes formed therein leading radially from the recess to the interior of the shell, and means for rotating the stock screw to force the plastic material along the bore and radially through the relatively rotating perforations into the opening in the extrusion head.

12. Extrusion apparatus for working, straining and extruding a plastic material, which comprises an extrusion cylinder having a longitudinally extending bore, an elongated stock screw rotatably mounted within the bore for simultaneously working and advancing a plastic material along the core, an extrusion head mounted at the delivery end of the extrusion cylinder and provided with an axial opening, a rotatable tubular member positioned at the delivery end of the screw for rotation therewith and provided with a multiplicity of perforations extending radially through its wall, a stationary tubular member projecting axially from the extrusion head into the rotatable tubular member and provided similarly with a multiplicity of perforations extending radially through its wall, the interior of said stationary tubular member communicating with the axial opening in the extrusion head, means for rotating the stock screw to force the plastic material axially along the bore in the extrusion cylinder and subsequently radially through the perforations in the relatively rotating tubular members into the opening in the extrusion head, and a tubular straining screen mounted on and closely surrounding one of the relatively rotating tubular members for straining the plastic material.

13. Extrusion apparatus for working, straining and extruding a plastic material, which comprises an extrusion cylinder having a longitudinally extending bore, an elongated stock screw rotatably mounted within the bore for simultaneously working and advancing a plastic material therealong, the delivery end of said screw being provided with a relatively deep, longitudinally extending, cylindrical recess and a plurality of holes leading radially from the exterior of the screw to the recess, an extrusion head mounted at the delivery end of the extrusion cylinder and provided with a central axial opening therein, a hollow cup-like member substantially complementary to the recess secured to and projecting from the extruding head into the recess in concentric relation therewith and having a plurality of holes formed therein leading radially from the recess to the interior of the cup-like member which in turn communicates with the opening in the extrusion head, a screen mounted on and surrounding closely the cup-like member for straining the plastic material, and means for rotating the stock screw to force the plastic material along the bore and radially through the holes in the relatively rotating members and through the opening in the extrusion head.

14. Extrusion apparatus for working, straining and extruding a plastic material, which comprises an extrusion cylinder having a longitudinally extending bore, an elongated stock screw rotatably mounted within the bore for simultaneously working and advancing a plastic material therealong, the delivery end of said screw being provided with a relatively deep, longitudinally extending, cylindrical recess and a plurality of holes leading radially from the exterior of the screw to the recess, an extrusion head mounted at the delivery end of the extrusion cylinder and provided with a central axial opening therein, an elongated core tube mounted on and projecting from the delivery end of the screw coaxially through the recess into the opening in the extrusion head, a hollow cylindrical shell projecting from the extrusion head coaxially into the recess and surrounding the core tube and the opening in the extrusion head, said shell having a plurality of holes formed therein leading radially from the recess to the interior of the shell, a cylindrical screen element fitting closely around and supported by the perforated shell for straining the plastic material, and means for rotating the stock screw to force the plastic material along the bore and radially through the relatively rotating perforations into the opening in the extrusion head.

References Cited in the file of this patent

UNITED STATES PATENTS

| | | |
|---|---|---|
| 1,595,470 | Johnson | Aug. 10, 1926 |
| 2,412,979 | Garvey | Dec. 24, 1946 |
| 2,488,595 | Henning | Nov. 22, 1949 |
| 2,695,422 | Gray | Nov. 30, 1954 |